May 2, 1961  A. G. F. WALLGREN  2,982,144
GEARING
Filed April 21, 1958
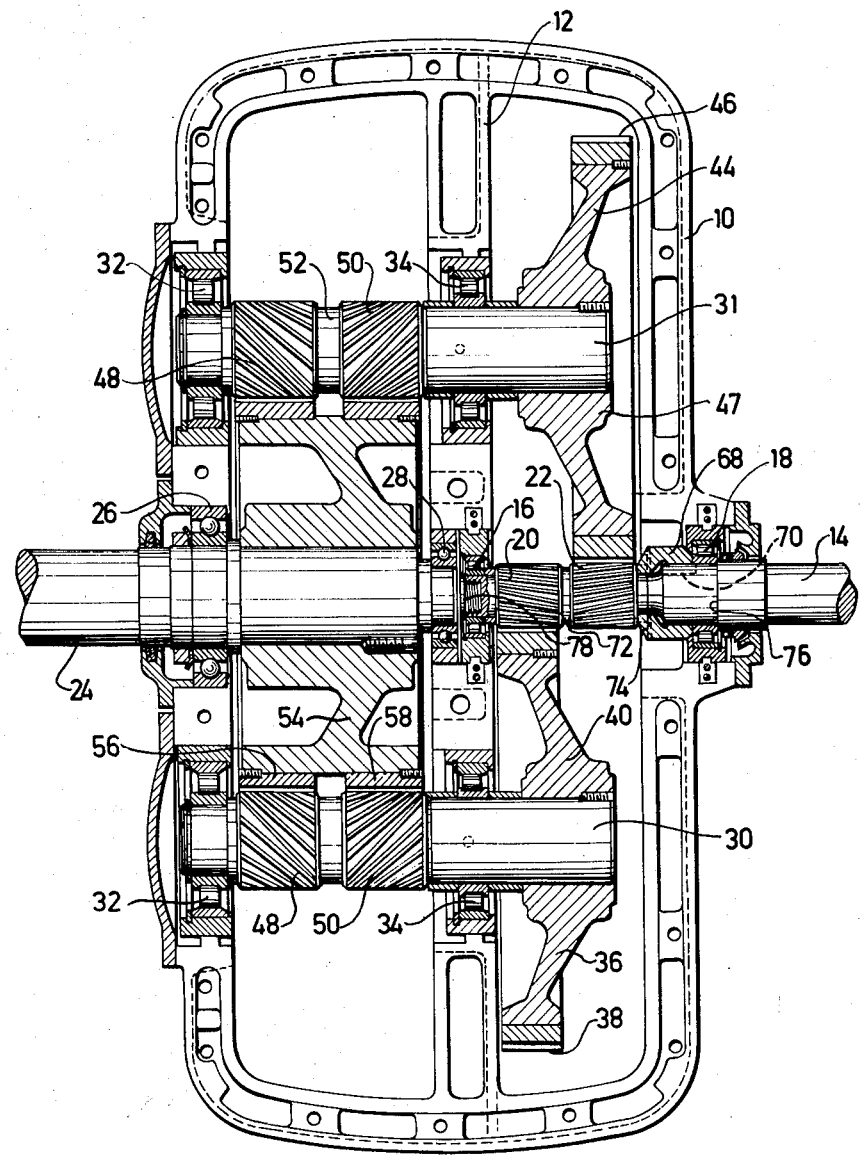
INVENTOR
AUGUST GUNNAR FERDINAND WALLGREN
BY *A. Yates Dowell*
ATTORNEYS с
United States Patent Office 2,982,144
Patented May 2, 1961

2,982,144

GEARING

August Gunnar Ferdinand Wallgren, 33 Viktor
Rydbergsgatan, Goteborg S, Sweden

Filed Apr. 21, 1958, Ser. No. 729,602

1 Claim. (Cl. 74—410)

This invention relates to a gearing.

More particularly this invention relates to a gearing comprising a casing, two main shafts, one thereof being a driving shaft and the other a driven shaft, each of said main shafts carrying a pair of ring gear members of the single helical type and together forming a herringbone gear.

Still more particularly this invention relates to a gearing comprising a casing, two main shafts, one thereof being a driving shaft and the other a driven shaft, each of said main shafts carrying a pair of ring gear members together forming a herringbone gear, and two intermediate shafts carrying each of them a pair of ring gear members of the single helical type and together forming a herringbone gear meshing with the herringbone gear of one of said main shafts, and further a ring gear member of the single helical type meshing each of them with one ring gear member of the herringbone gear of the other main shaft.

A gearing of the said type has the advantage that the driving and the driven shafts have transfer torque only. Further the ring gear members of two intermediate shafts need not be dimensioned for transfer of but half of the input effect. A condition for correct operation of a gearing with a plurality of intermediate shafts is equal distribution of the input torque to the intermediate shafts. As in practical realization of this basic idea the gearing cannot be manufactured with required accuracy in machining, the ring gear members mounted on the intermediate shafts meshing with the driving shaft are made flexible in a peripheral direction relative to the hubs of the toothed wheels on which they are formed. If due to inevitable divergence from correct dimensions only one gear is loaded at the moment when the operation of the gearing is started, its herringbone gear will be displaced resiliently until the gear of the other intermediate shaft also has come to engagement.

It has also been proposed already to make the herringbone gear provided on the input shaft axially displaceable in order to attain the equal distribution of the input moment to the two intermediate shafts. In this proposal all shafts with their gears or ring gear members have been made axially displaceable relatively to the casing of the gearing in order to be capable of adjusting themselves in response to any load from the driven machine part. This construction has involved such grave disadvantages with respect to the required dimensions of the gears, in particular those parts of the gearing rotating with high speed, and of the bearing of the intermediate shafts as totally to spoil the advantages otherwise obtainable with gearings provided with herringbone gears. Even the reliability of the gearing is impaired by the axial displaceability of the shafts relatively to the casing.

The main object of the invention is to provide a gearing of the type in consideration ensuring equal distribution of the torque on the intermediate shafts without employing resilient gear members.

One feature of the invention is to provide a gearing of this type the driven shafts of which are fixed axially relatively to the casing in order to minimize the stresses acting on the gears of the driving shaft.

A further feature of the invention is to provide a gearing the intermediate shafts of which carry the single helical ring gear members mounted on an overhanging shaft end portion so as to locate the bearings of said intermediate shafts to the shaft portion carrying the herringbone gear in order to minimize deflection of the shafts.

Further objects, features and advantages of the invention will become apparent from the following description considered in connection with the accompanying drawing which forms part of this specification and of which:

The drawing shows a top view of a gearing constructed according to the invention, the upper half of a casing enclosing the gearing having been removed and parts of the gearing proper being shown in a horizontal section through the shafts thereof.

Referring to the drawing, reference numeral 10 denotes the lower half of a casing enclosing the gearing and divided horizontally in the level of the shafts interconnected by said gearing. The casing 10 is subdivided into two chambers by a transversal vertical partition 12. A driving shaft 14 is carried by two bearings of which one designated by 16 is secured to the wall of the partition 12 whereas the other bearing denoted by 18 in the embodiment shown is mounted in the casing 10. The bearings are of a type permitting axial displacement of the shaft 14. Said shaft carries a primary gear constituted by two annular or ring gear members 20 and 22, each of said gear members being of the single helical type but cut in a direction opposite to that of the other ring member so that both members together form a gear of the double-helical or herringbone type. In the embodiment shown the ring gear member 20 has left-hand helical teeth and the ring gear member 22 right-hand helical teeth.

A driven shaft 24 is mounted coaxially with the driving shaft 14 and carried by two bearings of which one is designated by 26, is secured to the wall of the casing 10 and the other which is designated by 28, to the partition 12, one of said bearings, preferably the bearing 26 being a combined axial and radial thrust bearing fixing the position of the shaft 24 in the axial direction also. The bearing 28 may be a pure radial thrust bearing.

On either side of the shafts 14 and 24, respectively, two intermediate shafts 30, 31 are mounted in radial thrust bearings 32 and 34 secured to the wall of the casing 10 and the intermediate wall 12, respectively. The shafts 30, 31 may have identically the same shape. The bearings 32 and 34 allow the shafts 31 to be displaced axially. A toothed wheel 36 the teeth 38 of which mesh with the gear member 20 and thus are cut on right-hand helically is rigidly secured to the shaft 30. Said toothed wheel 36 has a hub portion 40 axially fixed on the intermediate shaft 30 and has a relatively great axial dimension. The toothed wheel 36 extends from the hub portion 40 axially and radially inclined inwardly so as to suit to the ring gear member 20. The intermediate shaft 31 carries a toothed wheel 44 the teeth 46 of which mesh with the ring gear member 22 of the primary herringbone gear and therefore has its teeth cut left-hand helically. With the exception of the teeth being cut in opposite directions the toothed wheels 36 and 44 may be of the same shape. The toothed wheel 44 thus extends from its hub portion 47 axially and radially inclined outwardly towards the gear member 22.

Each of the intermediate shafts 30, 31 carries a gear of the double-helical or herringbone type. In the embodiment shown said gear is formed in one piece with the shaft and constituted by two gear members 48, 50 spaced from one another so much as to leave a space 52 for the gear cutter. The shaft 24 carries a toothed wheel 54 provided with two rims of teeth 56 and 58 meshing with the gear members 48 and 50, respectively.

The input torque acting on the shaft 14 is distributed equally to the two intermediate shafts 30 and 31 due to the feature that said shaft 14 is axially displaceable. If at the moment when the shaft 14 starts its rotation the toothed wheel 36 only, for example, should transfer load from the gear member 20, the shaft 14 will be displaced axially for a few or a few tenths of a millimetre until the teeth 46 of the toothed wheel 44 have engaged the gear member 22. The intermediate shafts 30 and 31 rotating with a lower number of revolutions than the shaft 14 transfer the torque to the toothed wheel 54 and thus to the driven shaft 24 the number of revolutions of which is still lower. The toothed wheel 54 is guided in the axial direction by the bearing 26. As the toothed wheel 36 is of the single-helical type the intermediate shaft 30 tends to be displaced axially, but is prevented therefrom by the engagement of the teeth of the toothed wheel 54 with either the gear member 48 or the gear member 50. The intermediate shaft 31 has a corresponding tendency to displacement in the opposite direction, but is also prevented therefrom by the engagement of its gear 48, 50 with the toothed wheel 54. The axial forces produced by these tendencies to axial displacement are of equal magnitude and directed opposite to one another for which reason the bearing 26 is not subjected to any axial load. Due to the capacity of the shafts 30 and 31 of being displaceable axially relatively to the casing their gear members 48 and 50 are in known manner capable of adjusting themselves so as each of them to transfer an equal torque to the toothed wheel 54.

The intermeshing single-helical gear members 20, 22 of the input or driving shaft 14 and the single-helical gear members 38 and 46 of the intermediate shafts 30 and 31, respectively, are formed with teeth the angle of inclination of which is small, preferably amounting to not more than 10–12°. The angle of inclination is in this connection understood to define the inclination of the teeth relative to the generatrix. However, the ring gear members 56, 58 formed on the toothed wheel 54 mounted on the driven shaft 24 and the ring gear members 48 and 50 meshing therewith and mounted on the intermediate shafts 30 and 31, respectively, are cut with an angle of inclination materially larger and preferably many times larger than that of the teeth mentioned hereinbefore, the angle of inclination of the last mentioned teeth thus being of the order of magnitude of 45°. As appears from the aforesaid, the axial forces produced within the gearing system are absorbed by the system proper all shafts except one being axially displaceable relatively to the casing of the gearing. Therefore, it is of particular importance that the power component acting on the high-speed side of the gearing which in the embodiment shown means the teeth of the intermeshing gear members 20, 36 and 22, 44, respectively, which by the intermediate shafts are transferred to the low-speed side of the gearing which means the teeth of the intermeshing gear members 48, 50 and 56, 58, respectively, are as small as possible. This is attained by the small angle of inclination of the teeth of the high-speed side. The axial forces emanating from the high-speed side aggregate to form the axial forces produced on the low-speed side. The sum of these latter forces determines the breadth of the gears located on the low-speed or output side. Any increase of said breadth will increase the spacing between the bearings 32, 34 which feature causes a corresponding increase of the deflection of the intermediate shafts 30, 31. Due to the differently great angles of inclination the favourable result is obtained that the low-speed side of the gearing can be given the smallest possible dimensions and will be subjected to a minimum of deflection. This results in obtaining a reliable mounting of the intermediate shaft by means of two bearings only located on either side of and adjacent the gear members 48 and 50.

Immediately adjacent the bearing 18 a sleeve 68 encloses the shaft and is entrained by a wedge 70 in the rotation of the shaft 14. The two gear members 20 and 22 are carried along in the rotational movement by clutch couplings 72 and 74, respectively, disposed between said gear members and between the gear member 22 and the sleeve 68, respectively. The interior angular member of the bearing 18 bears against a shoulder 76 formed on the shaft 14 so as to fix said annular member and the adjacent members 68, 22, 20 mounted on the shaft as well as the internal annular member of the bearing 16 in the axial direction between said shoulder and a sealing member 78 secured by screwing to the interior end portion of the shaft. Due to the clutch couplings the ring gear members 20 and 22 need not be secured to the shaft by means of wedge joints for which reason said gear members may be formed with a small diameter so that a correspondingly great gear ratio is obtained.

The combined axial and radial thrust bearing 26, in particular when of the ball-bearing type, has a certain, though small end float and thus permits a corresponding axial displaceability of the shaft 24. Since the axial forces produced in the gearing constructed according to the invention balance one another, even relatively small oscillating axial forces introduced by one of the main shafts which means either the driving shaft 14 or the driven shaft 24 from either the driving motor or the driven machine part are adapted in some cases to cause disturbances due to the feature that the oscillations cause a tendency of the rotatable members of the gearing to oscillate in an axial direction. This tendency to axial displacement can be eliminated by a minor axial load produced within the gearing and subjecting the bearing 26 to an axial pre-stress. For this purpose the angles of inclination of the pinions 20 and 22 may be formed slightly differing so as to produce an axially acting force eliminating the float within the guide bearing 26. It is understood that also the teeth of the gear members 36 and 44 must present the same difference in the angles of inclination of their teeth.

The toothed wheels 36, 44, 54, 64 and 66 which have their teeth made in one piece with the other wheel portions are preferably made of a cast iron quality in which the graphite is spheroidal and which is known as nodular cast iron. It is possible to provide the combined radial and axial thrust bearing on the driving shaft instead of the driven shaft. Gear members of the single helical type of the intermediate shafts will then displace the driven shaft axially so much as to ensure equal distribution of the load. In all embodiments shown the driving shaft may be guided axially by a bearing while the herringbone gear 20, 22 as one single member is axially displaceable on said shaft.

The ring gear members 20 and 22 and the meshing single helical gears on the intermediate shafts 30 and 31 need not necessarily be identical. It is thus possible that the gear member 20 and the gear members 38 and 48, 50 mounted on the shaft 30 and transferring the torque to the toothed wheel 54 have another number of teeth or another pitch circle than the gear members 46 and 48, 50 co-operating with the gear member 22 and thus transferring the torque through the intermediate shaft 31 to the toothed wheel 54. This implies a difference between the single helical gears 38 and 46 and also between the gear members 48, 50 provided on either the intermediate shaft 30 or the intermediate shaft 31. As a consequence the intermediate shafts will be located in different spaced relation to the central axis of the main shafts 14 and 24. The difference in the number of teeth may be small, for instance so that the gear members 48, 50 of the intermediate shaft 30 have a number of teeth only by one unit differing from the number of teeth of the corresponding gear members 48, 50 of the other intermediate shaft 31. It is obvious that the gear change effected over each of the two intermediate shafts 30 and 31 must be the same.

The central axis of the main shafts 14 and 26 may be located slightly eccentrically relatively to one another. Then the gear members 48, 50 formed on the intermediate shafts 30 and 31, respectively, may be identical with one another and as a consequence the spacing of said intermediate shafts from the central axis of the shaft 24 be equal. The toothed wheels 36 and 44 on one hand and the ring gear members 20 and 22 on the other hand then must have differing numbers of teeth or differing pitch circles.

While a more or less specific embodiment of the invention has been described, it is to be understood that this is for purpose of illustration only and that the invention is not to be limited thereby, but its scope is to be determined by the appended claims.

What I claim is:

A long life gear reduction unit in which substantially all axial forces are balanced to avoid axial thrust on the bearings and uniform loading on the gear teeth comprising a gear housing having two compartments separated by a gearing supporting partition wall, a high speed drive shaft extending through one wall of the housing into one of said compartments, bearing means in said one wall rotatably supporting said drive shaft, pinion gears having helical teeth in opposed relation on said drive shaft between said one wall and said partition wall, a pair of intermediate shafts rotatably mounted in bearing means in said partition wall and in the wall of said housing opposite said one wall, a drive gear within said first compartment on an overhanging portion of each intermediate shaft, said drive gear on each intermediate shaft meshing with one of said pinion gears on said drive shaft whereby said intermediate shafts are caused to rotate in the opposite direction to said drive shaft, the teeth of said drive gears on said intermediate shafts having helical teeth of the opposite hand to the cooperating pinion gears on said drive shaft whereby substantially equal loads on each intermediate shaft will produce balanced axial forces on said drive shaft, a driven shaft rotatably mounted in bearing means in the opposite wall of said housing and in the partition wall of said housing, a ring gear fixed to said driven shaft and having ring gear portions of opposite hand helical teeth providing a herringbone ring gear, each of said intermediate shafts having cooperating pinion gear portions having opposite hand helical teeth to the ring gear portions meshing with the ring gear portions of said driven shaft, the bearing means of said driven shaft including thrust bearing means preventing axial movement of said driven shaft and the bearing means of the other shafts permitting limited axial movement whereby the axial position of operation of the gearing is controlled by said bearing means on said driven shaft, the angles of said helical teeth being selected so the angle of the helical gear teeth on the pinion gears on the drive shaft and cooperating gears on the intermediate shaft is materially smaller than the angle between the pinion gears on the intermediate shaft and the ring gear on the driven shaft whereby the axial dimension of the pinion gears on the intermediate shafts and the axial dimension of the gears on the intermediate shafts is kept to a minimum reducing the extension of the intermediate shafts between said partition and said opposite wall, said gearing being arranged to produce the desirable characteristics in the gearing system to provide continuous balanced loading on the gears in torque and axial forces, said gearing system providing for high speed continuous operation with a minimum of upkeep and repair.

References Cited in the file of this patent

UNITED STATES PATENTS

| | | |
|---|---|---|
| 1,351,317 | Alquist | Aug. 31, 1920 |
| 1,357,674 | Alquist | Nov. 2, 1920 |
| 1,434,697 | Heisler | Nov. 7, 1922 |
| 1,459,964 | Alquist | June 26, 1923 |
| 1,551,565 | Hodgkinson | Sept. 1, 1925 |
| 1,634,376 | Miller | July 5, 1927 |
| 1,759,689 | Day | May 20, 1930 |
| 1,803,295 | Bethune | Apr. 28, 1931 |
| 1,861,258 | Bethune | May 31, 1932 |
| 2,126,691 | Schmitter | Aug. 9, 1938 |
| 2,712,761 | Chung | July 12, 1955 |
| 2,734,396 | Falk et al. | Feb. 14, 1956 |
| 2,920,497 | Wilken | Jan. 12, 1960 |